US007150000B1

(12) United States Patent
Feldman (10) Patent No.: US 7,150,000 B1
(45) Date of Patent: Dec. 12, 2006

(54) COMPONENT DEVELOPMENT WITH AUTONOMOUS AND COMPILED COMPONENTS TO IMPLEMENT AND CONSUME SERVICES WITH COMPONENTS OPERATE IN EDIT AND RUN MODE

(75) Inventor: Michael Feldman, Minnetonka, MN (US)

(73) Assignee: Nash Controlware, Inc., Eden Prairie, MN (US)

( * ) Notice: Subject to any disclaimer, the term of this patent is extended or adjusted under 35 U.S.C. 154(b) by 908 days.

(21) Appl. No.: 09/638,491

(22) Filed: Aug. 15, 2000

Related U.S. Application Data (60) Provisional application No. 60/149,507, filed on Aug. 17, 1999.

(51) Int. Cl.
G06F 9/44 (2006.01)
(52) U.S. Cl. .............................. 717/103; 709/200; 705/8
(58) Field of Classification Search ................. 703/13; 717/103; 705/8; 709/200
See application file for complete search history.

(56) References Cited

U.S. PATENT DOCUMENTS

| 5,301,320 | A | * | 4/1994 | McAtee et al. ................. 705/9 |
| 5,524,246 | A |   | 6/1996 | Hurley et al. ................ 395/700 |
| 5,542,070 | A |   | 7/1996 | LeBlanc et al. ............ 395/500 |
| 5,587,935 | A |   | 12/1996 | Brooks et al. ............... 364/578 |
| 5,630,069 | A | * | 5/1997 | Flores et al. ..................... 705/7 |
| 5,745,901 | A | * | 4/1998 | Entner et al. ........... 707/103 R |
| 5,768,506 | A | * | 6/1998 | Randell ....................... 709/202 |
| 5,774,661 | A | * | 6/1998 | Chatterjee et al. .......... 709/203 |
| 5,848,393 | A | * | 12/1998 | Goodridge et al. ............. 705/8 |
| 5,867,824 | A | * | 2/1999 | Saito et al. ..................... 705/9 |
| 5,878,398 | A | * | 3/1999 | Tokuda et al. .................. 705/8 |
| 5,890,130 | A | * | 3/1999 | Cox et al. ...................... 705/7 |
| 5,940,804 | A | * | 8/1999 | Turley et al. ................... 705/9 |
| 5,960,404 | A | * | 9/1999 | Chaar et al. .................... 705/8 |
| 5,974,392 | A | * | 10/1999 | Endo ............................. 705/8 |
| 5,978,836 | A | * | 11/1999 | Ouchi ........................ 709/206 |
| 5,987,422 | A | * | 11/1999 | Buzsaki ......................... 705/9 |
| 5,999,910 | A | * | 12/1999 | Rosenfeld et al. ............. 705/7 |
| 5,999,911 | A | * | 12/1999 | Berg et al. ..................... 705/9 |
| 6,003,011 | A | * | 12/1999 | Sarin et al. .................... 705/9 |
| 6,014,673 | A | * | 1/2000 | Davis et al. ................ 707/202 |
| 6,026,365 | A | * | 2/2000 | Hayashi ........................ 705/9 |

(Continued)

OTHER PUBLICATIONS

Template Software, Developing a WFT Workflow System, Whole manual, 1997 copyright 1998.*

(Continued)

*Primary Examiner*—Todd Ingberg
(74) *Attorney, Agent, or Firm*—Kinney & Lange, PA (57) ABSTRACT

An architecture for developing a distributed information system comprises a service definition tool for generating service protocols as a service definition. Each service protocol includes a plurality of messages. The messages include incoming messages and outgoing messages. Each message carries a plurality of data fields. A component development tool generates a first and a second plurality of components that implement and consume services. Each component in the first plurality of components represents a physical entity in the distributed information system. Each component in the second plurality of components represents a logical entity in the distributed information system. A system development tool generates a plurality of component instances based on the first and the second plurality of components. An engine software program runs on each of a plurality of networked nodes. The engine software program provides a programmable run-time environment for hosting the plurality of component instances and supporting communication between component instances.

27 Claims, 5 Drawing Sheets

U.S. PATENT DOCUMENTS

| | | | |
|---|---|---|---|
| 6,032,124 A * | 2/2000 | Saito et al. ..................... 705/9 |
| 6,038,538 A * | 3/2000 | Agrawal et al. ................ 705/7 |
| 6,038,541 A * | 3/2000 | Tokuda et al. .................. 705/8 |
| 6,058,413 A * | 5/2000 | Flores et al. ................. 718/101 |
| 6,073,109 A * | 6/2000 | Flores et al. .................... 705/8 |
| 6,115,640 A * | 9/2000 | Tarumi ........................ 700/99 |
| 6,151,583 A * | 11/2000 | Ohmura et al. ................. 705/8 |
| 6,256,651 B1 * | 7/2001 | Tuli ........................... 715/526 |
| 6,275,846 B1 * | 8/2001 | Kondo et al. ................ 709/200 |
| 6,370,681 B1 | 4/2002 | Dellarocas et al. ............ 717/1 |
| 6,396,511 B1 | 5/2002 | Karino ....................... 345/744 |
| 6,401,081 B1 | 6/2002 | Montgomery et al. ........ 705/63 |
| 6,424,979 B1 * | 7/2002 | Livingston et al. .......... 715/511 |
| 6,430,538 B1 * | 8/2002 | Bacon et al. .................... 705/9 |
| 6,442,563 B1 * | 8/2002 | Bacon et al. ........... 707/103 R |
| 6,442,594 B1 * | 8/2002 | Ouchi ........................ 709/206 |
| 6,754,885 B1 * | 6/2004 | Dardinski et al. .......... 717/113 |
| 7,089,530 B1 * | 8/2006 | Dardinski et al. .......... 717/105 |

OTHER PUBLICATIONS

Template Software, Using the WFT Development Environment, Whole manual, 1997 copyright 1998.*

Template Software, Using the SNAP Communication Component, Whole manual, 1997 copyright 1998.*

"The Object Primer The Application Developer's Guide to Object-Orientation,", Scott Ambler, Jan. 4, 1996, pp. 1-248.*

"Object-Oriented Information Systemns Planning and Implementation", David A. Taylor, Apr. 10, 1992, pp. 1-357.*

Workflow Template Training Course Version 8.0, 1997, Section B.*

Making the Future Safe for the Past Adding Genericity to the Java Programming Language, Gilad Bracha et al, ACM, 1998, pp. 183-200.*

Compatibility Genericity with Run-time Type for the Java Programming Language, Robert Cartwright et al, ACM, 1998, pp. 201-215.*

* cited by examiner

COMPONENT DEVELOPMENT WITH AUTONOMOUS AND COMPILED COMPONENTS TO IMPLEMENT AND CONSUME SERVICES WITH COMPONENTS OPERATE IN EDIT AND RUN MODE

CROSS-REFERENCE TO RELATED APPLICATION(S)

This application claims the benefit of the filing date of U.S. provisional application Ser. No. 60/149,507, entitled "SYSTEM AND METHOD FOR GENERATING DISTRIBUTED INTELLIGENCE SYSTEMS" which was filed Aug. 17, 1999.

BACKGROUND OF THE INVENTION

Developers of distributed information systems are faced with daunting complexities. The traditional approach to system design and development requires a monumental task of understanding constantly changing requirements, while designing and implementing the system as a whole. The requirements for the system are collected and interpreted by software developers who are not the domain experts. At the same time, people who have an intimate knowledge of the system requirements are not the software engineers.

There are several inherent problems with existing approaches:

1. Multi-phased design and development process that is not extensible.

Difficulty in communication between developers and domain experts results in multiple iterations of a system design and multiple patches and changes to the delivered product. Such a system, when completed, becomes a legacy island in the enterprise that is impossible to change, extend, or integrate into the global information infrastructure.

Prior art solutions have tried to solve this major problem by introducing new languages targeted to capture requirements for the system design, such as the graphical "Use Cases" language of UML. These new languages add an extra level of complexity and require a high level of commitment from both groups involved in the design and development process. The biggest problem with this approach is that the design model is not present in the system delivered to the customer. An end user gets a system that consists of files, modules, and executables, but not of accounts, machines, units, etc. From the end users' standpoint, all of the time that went into the requirements capturing and modeling was wasted, because the system does not represent their real-world entities that they interact with, but some foreign entities forced on them by then system implementation.

This prior art approach does not help developers simplify the design and implementation of the system. Developers have to deal with the details of a target deployment environment, communication and hardware. An object-oriented approach to the system implementation, while helping in the design process, leaves them with monolithic applications once compiled.

2. Changes are difficult to make.

This application orientation makes prior art approaches much more difficult to use in the environments where requirements are constantly changing and system complexities are increasing. Even component specifications that have been introduced did not address the distributed nature of the systems, nor did they help to solve the complexities of the development process, and were a mere extension of the client-server model of the past.

3. Communication between applications is limited.

Monolithic applications have no way to interact with other applications deployed in the enterprise. A special integration infrastructure has to be used to build an integration layer to pull it all together. This integration is an afterthought solution that is an application by itself and has all the problems noted above.

4. Difficulty in transferring large amounts of data to a central point.

With traditionally developed information systems, decision-making is centralized even though the information sources are distributed throughout the enterprise. Generally, information is transferred to a central point where it is processed. In physically distributed enterprises, with either large buildings or worldwide operations, it is very difficult to transfer large amounts of information to a central point. Often the solution is to install multiple copies of an application, each in an area of the enterprise. This results in unconnected islands, with little or no synchronization between areas.

5. Not designed for real-time.

Most prior art applications were not designed for real-time behavior. With the exception of real-time control systems, most applications were designed to run periodically, perhaps a few times a day or once a week to update inventory, send orders to the suppliers, or process production data for the last day or week. This limitation prevents businesses from immediately reacting to needs of customers or reacting to problems with internal operations. There is a need to have all applications, including supply chain management, e-commerce and plant-floor operations, to react in real-time as an integrated enterprise.

BRIEF SUMMARY OF THE INVENTION

An architecture for developing a distributed information system comprises a service definition tool for generating service protocols as a service definition. Each service protocol includes a plurality of messages. The messages include incoming messages and outgoing messages. Each message carries a plurality of data fields. A component development tool generates a first and a second plurality of components that implement and consume services. Each component in the first plurality of components represents a physical entity in the distributed information system. Each component in the second plurality of components represents a logical entity in the distributed information system. A system development tool generates a plurality of component instances based on the first and the second plurality of components. An engine software program runs on each of a plurality of networked nodes. The engine software program provides a programmable run-time environment for hosting the plurality of component instances and supporting communication between component instances.

DETAILED DESCRIPTION

The architecture presented by this invention uses components as building blocks for distributed information systems. By placing components as the centerpiece of the design and development process, this invention improves on the prior use of components as application parts that are glued together by application code. This invention makes another step toward generalization of components by defining them as service providers and consumers. A service represents an "operation" or activity that is continuous and internal to the component. Because implementation of the service is internal to the component, external entities do not have direct access to the service. External entities can interact with the service by sending messages to and receiving messages from the service implementation (component). Services are defined by protocols—collections of incoming and outgoing messages. Another way to describe service protocols is to treat incoming messages as function calls, implemented by the service, and outgoing messages as events raised by the service. Service providers are responsible for implementing handlers for incoming messages as defined by the service protocol. Service consumers are responsible for implementing handlers for outgoing messages as defined by the protocol. Any consumer can use any provider if they implement the same protocol. This allows components to be modeled as collections of provided and consumed services. For example, a product routing component can implement routing service functionality and consume equipment service functionality of components representing factory floor equipment. Components can provide or consume any number of services. This adds flexibility to components and allows a system approach to development.

Figure 1:
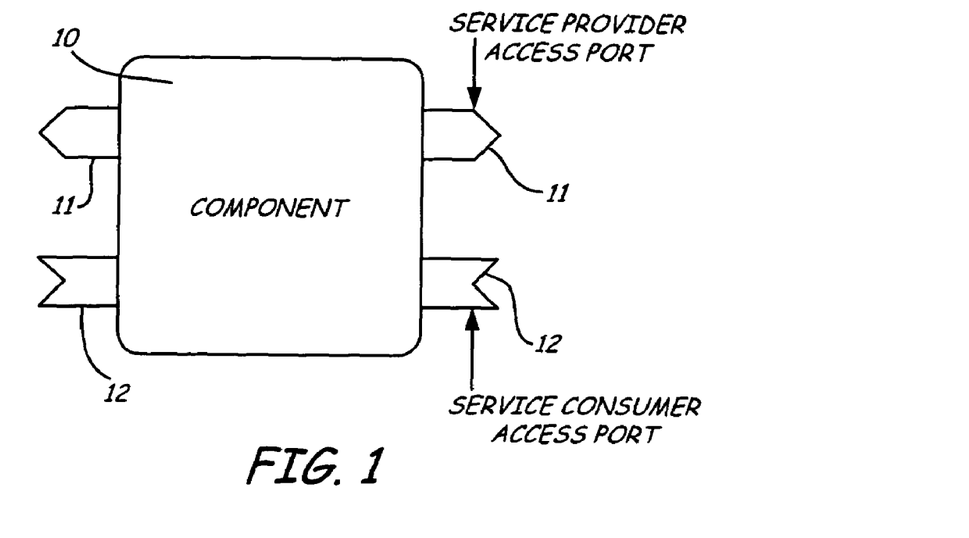
FIG. 1 shows a diagram of a component which provides implementation of service protocols.

FIG. 1 shows component 10, which provides implementation of service protocols by exposing ports 11 and 12. Component 10 may implement any number of service protocols as service provider and/or as service consumer. When a component 10 implements a service protocol, it exposes an access port. There are service provider port 11 and service consumer port 12 implementations of access ports, depending on required functionality. Service protocols are always defined from the provider point of view. Consumer implementation reverses direction of messages as defined in the protocol, e.g. incoming messages become outgoing, and outgoing messages are coming in. System development tools use access ports to identify available end points for the possible interconnections between component instances.

The following is an example of a service protocol definition in XML (Extensible Markup Language):

```
<Service Name = 'Mixing Station'>
    <In>
        <Message Name = 'Start'>
            <Parameter Name = 'Duration', Type = long />
```

-continued

```
        </Message>
        <Message Name = 'Stop'/>
    </In>
    <Out>
        <Message Name = 'Status'>
            <Parameter Name = 'Elapsed_Time', Type = long />
            <Parameter Name = 'Level', Type = double />
            <Parameter Name = 'Error_Code', Type = Errors/>
        </Message>
    </Out>
    <Type Name = 'Errors', Type = enum>
        <Field Name = 'None', Value = 0 />
        <Field Name = 'Empty', Value = 1 />
        <Field Name = 'Motor_Failed', Value = 2 />
        <Field Name = 'Cycle_Completed', Value = 3 />
    </Type>
</Service>
```

This example depicts a protocol for the service "Mixing Station" that has two incoming messages, "Start" and "Stop", where the "Start" message carries the parameter "Duration" of the type "long". It also has one outgoing message "Status" with three parameters—"Elapsed_Time" of the type "long", "Level" of the type "double", and "Error_Code" of the locally defined type "Errors" that can be one of the following values: "None", "Empty", "Motor_Failed", or "Cycle_Completed".

Figure 2:
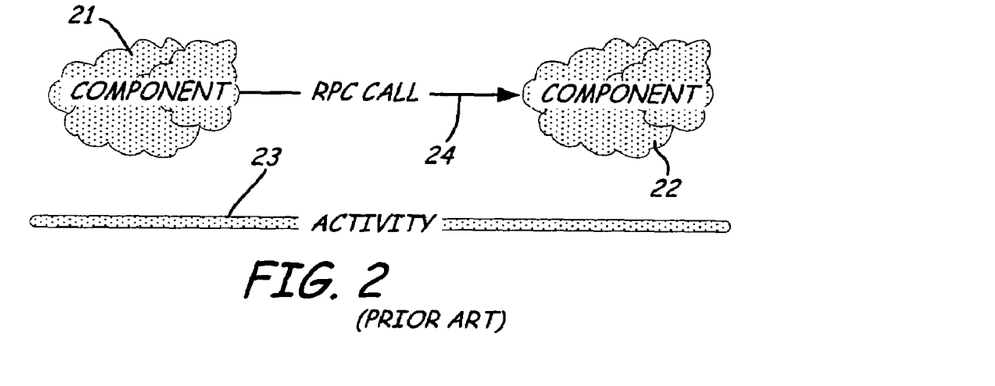
FIG. 2 shows a diagram illustrating the interaction of prior art components.

Service protocols are different from interfaces as defined by DCE (Distributed Computing Environment) RPC (Remote Procedure Call), COM (Component Object Model)/DCOM (Distributed COM), CORBA (Common Object Request Broker Architecture) and Java RMI (Remote Method Invocation). Service protocols, according to the present invention, assume an asynchronous, bidirectional communication model, unlike the synchronous, unidirectional, RPC-based model of the above-mentioned specifications. This invention's approach frees components from being dependent on the knowledge of a peer component, but more importantly, components are not dependent on the presence of a peer at all. These prior art specifications are based on an assumption of one component being a client of the other component. FIG. 2 represents the interaction of prior art components 21 and 22, where activity 23 can occur only when the two components 21 and 22 interact. Component 22 has no knowledge of the capabilities of component 21; component 22 is a server and component 21 is a client. Communication between components 21 and 22 is unidirectional as represented by arrow 24. Communication is initiated with an RPC call. Activity 23 exists only in the context of the RPC call from component 21 to component 22. In other words, component 21 has to get a reference to the peer component 22 or to the proxy of the peer by creating it, or by some other means. This prior art approach also implies that one component cannot work without other components present online. That is, any activity 23 within a system can occur only when components interact. In a distributed, multi-node system, this requirement is impossible to satisfy without going into extreme hardware and network solutions that are expensive, proprietary and cannot be cost-effectively deployed on a large scale. This also limits what can be modeled using this approach. Most real-world objects operate on a continuous basis, concurrently, not just during function calls, which forces developers to emulate concurrence in their components when developing for existing specifications.

Figure 3:
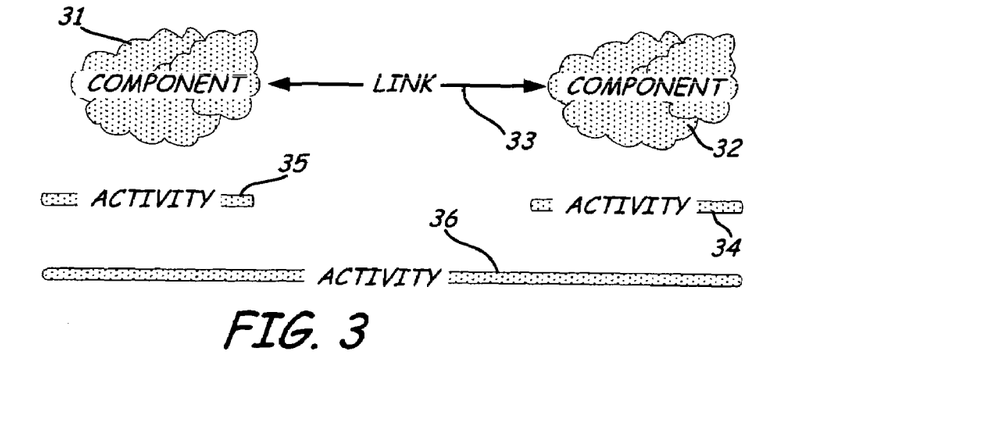
FIG. 3 shows a diagram illustrating self-sufficient components according to the present invention.

FIG. 3 shows how the invention's components can interact while being self-sufficient. Components 31 and 32 have corresponding activities 35 and 34. Exchanging messages over link 33 creates additional activities 36. This invention's components 31 and 32 are different from the prior art in that they are designed to operate as stand-alone entities, with no knowledge of peers or proxies, executing their own activities 34 and 35. A run-time environment handles all communication details for the components 31 and 32. Service consumers can come and go, as they will, without affecting functionality of the service providers. This also shifts design decisions by the component developer from functionality of the system as a whole to functionality of the component. For example, a component monitoring production output can be designed and built without knowledge of the system it will be used in. Communication between components is defined not by the component developer, but by the system developer and can be changed at any time without affecting the components themselves. Communication is accomplished by creating a link 33 between a service provider component port 11 and a complimentary service consumer component port 12 (see FIG. 1). Link implementation, provided by the system run-time, is responsible for delivering messages between connected ports. A link 33 can be created between two ports of the same component. A port can have an unlimited number of links 33 connected to it, such supporting one to many, many to one and many to many patterns. Interacting components create additional, high level activities that implement desired system functionality 36.

An effect of this inventive approach is simplification of system design. Because each component is a stand-alone entity, it can be designed, implemented and tested stand-alone. This greatly simplifies testing and debugging of the system because there is no additional 'glue' code to test and debug. It also promotes a common, domain specific terminology use within a system. For example, a control solution may use components such as sensors, pumps and valves, where a MES (Manufacturing Execution System) solution may use BOM (Bill Of Materials), inventory and work cell components. Collaboration between developers and domain experts is simplified because of this and there no need for yet another language to use.

Figure 4:
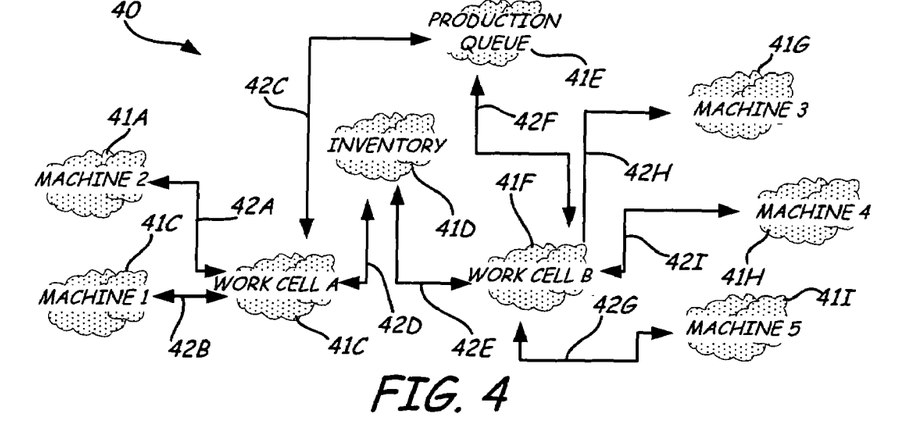
FIG. 4 shows an example of a system model built from components and connected by links according to the present invention.

In the real world, entities modeled by components are parts of a hierarchical structure, where components on the different levels are dependent on other components in the hierarchy. The old approach for modeling this decomposition, where the whole system is modeled and then components are built as parts of the whole, produces non-portable and inflexible solutions. This is a top to bottom approach. This invention reverses this approach by modeling from bottom up. This makes a lot of sense because bottom level components are more generic than components on the higher levels of a hierarchy. For example, in an industrial control system, components such as sensors, valves, motors, etc are generic, where components directly related to the process implemented are specific to that process. In a MES system, generic components are: inventory item, work cell, final product, etc.; and non-generic components are: process manager, production sequencer, and BOM. FIG. 4 shows an example of a system model 40 built from components 41A–41I (collectively referred to as components 41) connected by links 42A–42I (collectively referred to as links 42). By building libraries of generic components 41, new systems can be created with minimal new development efforts and improved reliability by defining components 41 and linking them together with links 42.

Users, building solutions as defined by this invention, do not deal with applications any more—they work with the system as a whole. This is again in contrast to the prior art solutions where distributed systems are built of multiple applications. Tools, targeting domain experts/users, reinforce and promote this approach to system development. Because there is not a monolithic application anywhere in the system, but a hierarchy of components, system tools can represent a user with the picture of the system as it was originally modeled. This preservation of design representation simplifies deployment and management of a completed system, as well as communication between developers and users of the system. It also allows a continuous approach to the system implementation, where new functionality and features are added while preserving and extending existing functionality and maintaining a model up to date.

Figure 5:
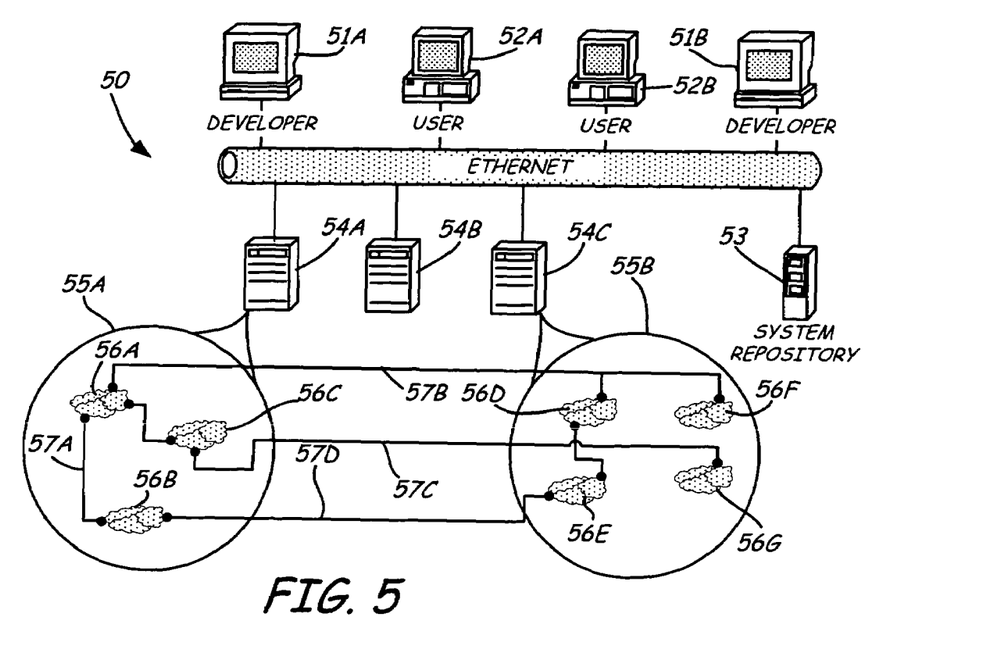
FIG. 5 shows a system infrastructure according to the present invention.

FIG. 5 shows system infrastructure 50, which includes networked developer workstations 51A–51B (collectively referred to as developer workstations 51), user workstations 52A–52B (collectively referred to as user workstations 52), nodes 54A–54C (collectively referred to as nodes 54) and system repository 53. This invention prescribes an infrastructure that consists of networked computers, called nodes 54, each hosting an instance of this invention's run-time software 55. This run-time software 55 is a container for component instances 56A–56G (collectively referred to as component instances 56). Component instances 56 and links 57A–57D (collectively referred to as links 57) may be created and destroyed remotely, using system management tools. These tools are used to deploy complete solutions by deploying component instances 56 to specific nodes 54. Component instances 56 may be moved from node to node while preserving links 57 and configuration data. Each node 54 has up-to-date configuration data, stored locally, that has all information about component instances 56, links 57, etc. This information allows nodes 54 to shut down and restart without any additional information required, which contributes to overall robustness of the system.

All information about system 50 is stored in the System Repository 53. System Repository 53 includes service protocol definitions, components, component instance data, links, node deployment information, etc. System Repository 53 is populated using system tools and is transparent to the user or developer. This information is not required for any of the run-time activities within the system. It can be treated as a centralized, redundant directory, and can be recreated from information stored on nodes 54.

Figure 6:
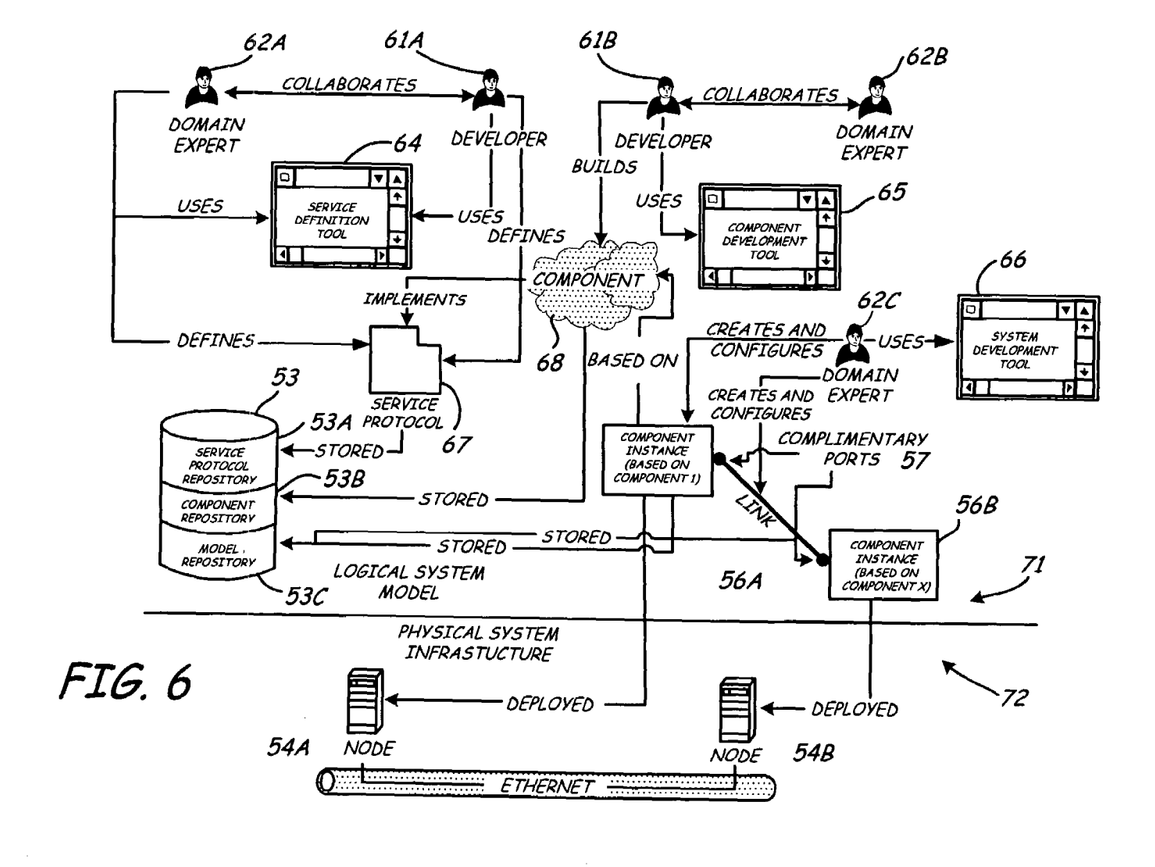
FIG. 6 shows an architecture for creating and managing distributed information systems according to the present invention.

This invention presents a new architecture for creating and managing distributed information systems, shown on FIG. 6. System development starts with the modeling phase that involves developers 61A–61B (collectively referred to as developers 61) and domain experts/users 62A–62C (collectively referred to as domain experts/users 62).

New Services are defined, by means of Service Protocols 67, using the Service Definition Tool 64. Developers 61 and domain experts 62 contribute to this phase of development. Developed service protocols are stored in the Service Protocol Repository 53A, which is part of the System Repository 53. The Service Protocol Repository is a catalog of all defined service protocols in the system. Service protocols may be exported from and imported into the Service Protocol Repository. Service protocols can be re-used from system to system.

Developers 61, in collaboration with domain experts 62, create new Components 68 that implement services based on newly defined and/or existing service protocols 67. Developers use the Component Development Tool 65 to build components 68 and to store them in Component Repository 53B. A given component 68 may implement unlimited numbers of services, both as a consumer and as a provider.

Each implemented service protocol is exposed as a Service Access Port, such as service access ports 11 and 12, shown in FIG. 1. The component developer may define Configuration Attributes. Attributes are used to configure individual instances of a component 68. Component developers use attributes to alter component functionality at run-time based on the values supplied. Component Repository 53B is a catalog of all components 68 defined in the system As with service protocols, components 68 can be shared between multiple systems.

Domain experts/users 62 utilize the System Development Tool 66 to define system behavior by creating and configuring (attributes are configured) instances of components 56A–56B (collectively referred to as component instances 56). The System Development Tool 66 stores all configuration information in the Model Repository 53C. When created, each instance 56 is given a meaningful, unique name, usually reflecting its system location and/or functionality. Component instances 56 are connected through Links 57—definitions of the communication channel. A link 57 can be created between two Service Access Ports if they represent two ends of the same Service Protocol 67, e.g. if the first port represents a service provider and the second port represents a complementary (inverse version of the same service protocol) service consumer. Each port may be connected to any number of complementary ports on any number of component instances 56, including the parent component instance itself.

Figure 7:
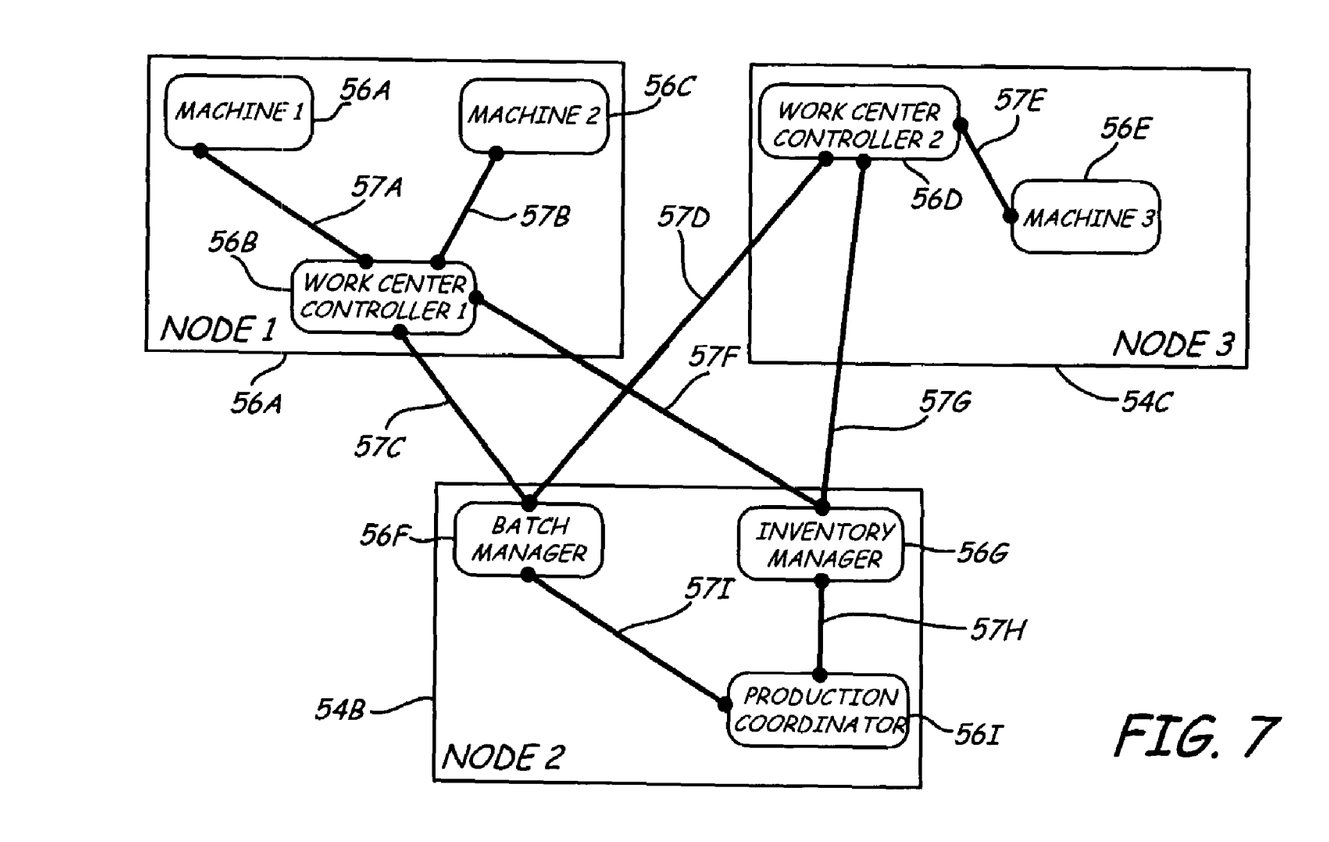
FIG. 7 shows a diagram illustrating the deployment of component instances and links to nodes.

FIG. 7 presents a deployment diagram for component instances 56 and links 57 as they are assigned to nodes 54. By creating instances 56 of the components and connecting them by links 57, the user builds a Logical System Model 71 (see FIG. 6). At this point, component instances 56 are defined but are not yet running; they have to be deployed (mapped) to the Physical System Infrastructure 72 by assigning component instances 56 to Nodes 54, using System Development Tool 66. As shown in FIG. 7, component instances 56A, 56B and 56C are deployed to node 54A, component instances 56F, 56G and 56I are deployed to node 54B, and component instances 56D and 56E are deployed to node 54C. Nodes 54 are networked together using any media that supports IP protocols.

Figure 8:
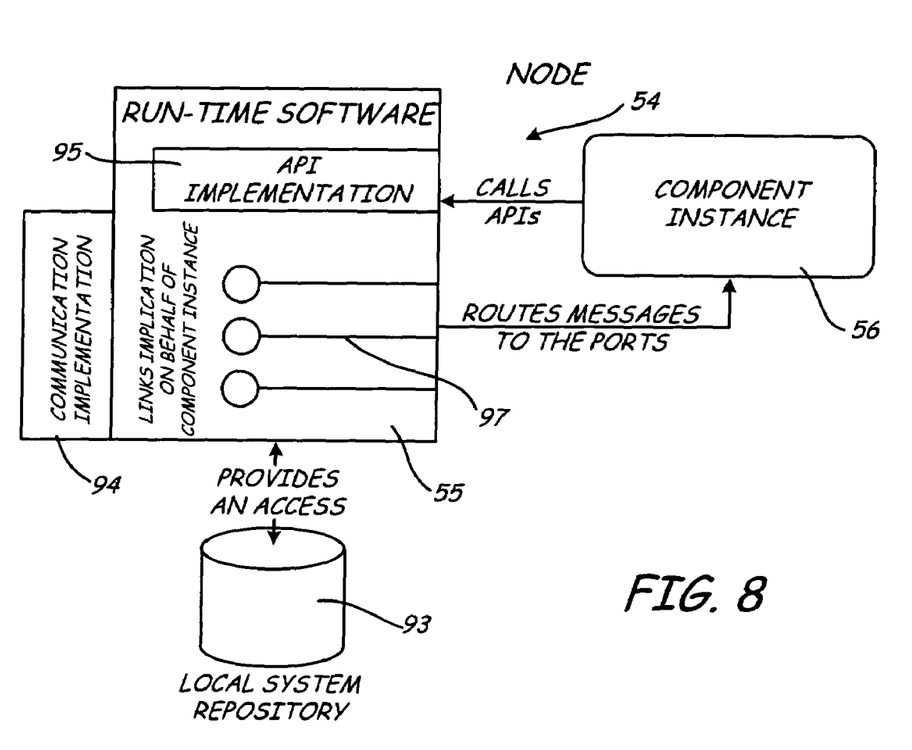
FIG. 8 shows a diagram illustrating the interaction between a component instance and run-time software.

FIG. 8 illustrates the interaction between a component instance 56 and run-time software 55. Run-time software 55 implements API (Application Programming Interface) 95, communication 94, Local System Repository 93 and Active Links Table 97. Once assigned to the node 54, component instance 56 data is downloaded to the target node and stored in the Local System Repository 93. The node's Run-time Software 55 is responsible for creating an instance 56, supplying it with configuration data and establishing links 57. Run-time software 55 is a container for component instances 56 and provides implementation of the API 95 used by the component developers 61 to access container functionality. Container functionality includes timing, scheduling, configuration data access, persistence, communication 94 and security. Run-time software 55 is dynamically changing, based on links 57 defined for the current node 54. Because component instances 56 do not have any information about peers, it is the responsibility of the run-time software 55 to manage all communication details as defined by links 57. This is in contrast with existing architectures, where run-time containers are rigid and responsibilities are shifted to the component implementation. By adding programmability features to the run-time and isolating component implementation from the system composition, this invention provides a flexible component deployment infrastructure.

The System Development Tool 66 can be used to modify configuration data for component instances 56. If a component instance 56 is deployed, these changes are sent to the node's 54 run-time environment 55, which in turn notifies the component instance 56 of the changes and provides new configuration to the instance 56. If a deployed instance 56 is deleted from the Model Repository 53C, it would be removed from the node 54, and all related data would be deleted from the Local System Repository 93. All active links 57 connected to the deleted instance 56 would be shutdown and the run-time software 55 would deny any request of connection addressed to this instance 56. Deleting an instance 56 on one end of a link 57 automatically deletes the link 57 itself. These changes are propagated to the nodes 54 where affected component instances 56 were deployed.

New links 57 may be created at any time using the System Development Tool 66. If a link 57 is created between two deployed component instances 56, the link information is sent to the nodes 54 involved and stored in both nodes' Local System Repository 93. Run-time software 55 then creates a logical connection and starts passing messages to and from the instance's 56 port. Establishing a link 57 is a node's 54 local operation, and is not involved in any communication with the rest of the system. This ensures that system components, such as nodes 54 and system repository 53, can go on and off line without affecting overall system functionality. Note that this is only true if the off-line node 54 is not hosting any component instances 56 whose presence is required for normal system operation. Creating redundant component instances 56 and links 57 and distributing them across multiple nodes 54 can solve this problem, but this relates to the particular system design and is outside of the scope of this invention.

Although the present invention has been described with reference to preferred embodiments, workers skilled in the art will recognize that changes may be made in form and detail without departing from the spirit and scope of the invention.

The invention claimed is:

1. An architecture for developing a distributed information system, the architecture comprising:
    a component development tool for generating and storing in computer readable form a plurality of autonomous and compiled components that implement and consume services, the components capable of operating in an edit mode and a run mode;
    a system development tool for defining, storing in computer readable form, and hosting a plurality of component instances based on the plurality of components, configuring the plurality of component instances, and defining, storing in computer readable form, and hosting links between component instances, without requiring writing of code, wherein the component instances are capable of operating in the edit mode while hosted by the system development tool; and
    an engine software program to provide a dynamic run-time environment for hosting the plurality of component instances and supporting communication between component instances based upon the defined links, wherein the component instances are capable of operating in the run mode while hosted by the engine software program.

2. The architecture of claim 1, further comprising:
a service definition tool for generating service protocols that are implemented by components, the service protocols defining a format of messages to be sent between ports of component instances; and
wherein links defined between component instances are defined between the ports of component instances.

3. The architecture of claim 2, wherein each of the ports comprises either a service provider port or a service consumer port.

4. The architecture of claim 3, wherein service provider ports and service consumer ports based on the same service protocol are complementary.

5. The architecture of claim 4, wherein the system development tool only allows links to be defined between service provider ports and complementary service consumer ports.

6. The architecture of claim 5, wherein a component instance includes at least one service provider port that allows multiple simultaneous links with complementary service consumer ports.

7. The architecture of claim 5, wherein component instances are executed concurrently, and wherein the communications between service provider ports and complementary service consumer ports are asynchronous.

8. The architecture of claim 2, and further comprising a central system repository for storing the components, the component instances, link data, infrastructure configuration and configuration data for the service protocols.

9. The architecture of claim 1, wherein the component development tool provides the capability of representing components as a first and a second plurality of components, each component in the first plurality of components representing a physical entity in the distributed information system, and each component in the second plurality of components representing a logical entity in the distributed information system.

10. The architecture of claim 1, wherein each of the plurality of component instances is self-sufficient.

11. The architecture of claim 1, wherein the engine software program runs on each of a plurality of networked nodes.

12. The architecture of claim 11, wherein the system development tool represents the distributed information system as a single entity, regardless of physical node and network composition into which the component instances will be deployed.

13. The architecture of claim 12, wherein the system development tool allows changes to be made to the component instances deployed to and hosted by the plurality of networked nodes and allows changes to be made to links between the component instances deployed to and hosted by the plurality of networked nodes.

14. The architecture of claim 13, wherein the system development tool allows changes to be made to the component instances and allows changes to be made to links between the component instances, without requiring writing of additional code, wherein the system development tool allows the changes to be made while the distributed information system is running.

15. The architecture of claim 14, wherein the system development tool allows deletion of the component instances deployed to and hosted by the plurality of networked nodes and allows deletion of communication links between the component instances deployed to and hosted by the plurality of networked nodes, wherein the system development tool allows the deletions to occur while the distributed information system is running.

16. The architecture of claim 11, wherein the system development tool deploys each component instance to one of the plurality of networked nodes.

17. The architecture of claim 11, and further comprising a local repository on each of the plurality of nodes, the local repository on each node storing data defining the component instances deployed to and hosted by that node and storing link data for the component instances deployed to and hosted by that node.

18. The architecture of claim 1, wherein at least one of the component instances supports continuous activities internally.

19. The architecture of claim 1, wherein each of the component instances is configurable to participate in activities that are collectively performed by multiple component instances.

20. The architecture of claim 1, wherein the only dependencies between component instances that are linked to each other are logical dependencies implemented using the component development tool.

21. An architecture for developing a distributed information system, the architecture comprising:
a component development tool for generating and storing in computer readable form autonomous and compiled components that implement and consume services, the components capable of operating in an edit mode and a run mode;
a system development tool for defining, storing in computer readable form, and hosting a plurality of component instances based on the plurality of components, configuring the plurality of component instances, and defining, storing in computer readable form, and hosting links between component instances, wherein the component instances are capable of operating in the edit mode while hosted by the system development tool; and
an engine software program to provide a programmable run-time environment for hosting the plurality of component instances and implementing the links to provide bi-directional communication paths between the plurality of component instances, wherein the component instances are capable of operating in the run mode while hosted by the engine software program.

22. The architecture of claim 21, further comprising a service definition tool for generating service protocols which define a format of messages to be sent through a plurality of ports, each port being associated with a component instance.

23. The architecture of claim 21, wherein the engine software program provides the bi-directional communication paths between linked ports.

24. The architecture of claim 21, further comprising a plurality of networked nodes running the engine software program, wherein the engine software dynamically manages ports and links for the component instances across the plurality of networked nodes.

25. The architecture of claim 21, wherein the component development tool is designed to be operated by a person skilled in computer programming.

26. The architecture of claim 21, wherein the system development tool is designed to be operated by a person without skill in the art of computer programming.

27. The architecture of claim 21, wherein any component instance having a consumer port that complies with a first service protocol may be configured to communicate with any component instance having a provider port that also complies with the first service protocol.

* * * * *

UNITED STATES PATENT AND TRADEMARK OFFICE
CERTIFICATE OF CORRECTION

PATENT NO.       : 7,150,000 B1                                    Page 1 of 1
APPLICATION NO.  : 09/638491
DATED            : December 12, 2006
INVENTOR(S)      : Michael Feldman It is certified that error appears in the above-identified patent and that said Letters Patent is hereby corrected as shown below:

Column 7, Line 8, delete "system As", insert --system.  As--

Signed and Sealed this

Eighth Day of May, 2007

JON W. DUDAS
*Director of the United States Patent and Trademark Office*